2,993,902
PREPARATION OF VAT DYESTUFFS OF THE NAPHTHOYLENE DIARYLIMIDAZOL SERIES

Paul A. Studer, Springfield, N.J., and Joseph S. Milazzo, Bronx, N.Y., assignors to General Aniline & Film Corporation, New York, N.Y., a corporation of Delaware
No Drawing. Filed Mar. 19, 1959, Ser. No. 800,362
5 Claims. (Cl. 260—282)

This invention relates to vat dyestuffs, and relates more particularly to the preparation of nitrogen-containing vat dyestuffs of the naphthoylene diarylimidazol series.

This application is a continuation in part of our application Ser. No. 668,033, filed June 26, 1957, now abandoned.

It is an important object of this invention to provide a novel process for the preparation of nitrogen-containing vat dyestuffs of the naphthoylene diarylimidazol series wherein an aqueous reaction medium is employed.

Other objects, together with certain advantages, of this invention will appear from the following detailed description and claims.

In the copending application of Bloom and Deutsch, Ser. No. 637,637 filed February 1, 1957, now Patent No. 2,908,685, there is described the preparation of a vat dyestuff by halogenating the cis-isomer obtained by condensing a 1,4,5,8-naphthalene tetra carboxylic acid with an amine, employing nitrobenzene as the reaction medium. One process for preparing this cis-isomer is described in U.S. Patent No. 1,588,451. In accordance with the process of this patent, when condensing 1,4,5,8-naphthalene tetra carboxylic acid with ortho-phenylenediamine, a mixture of two isomeric dyestuffs of the following formulae is obtained:

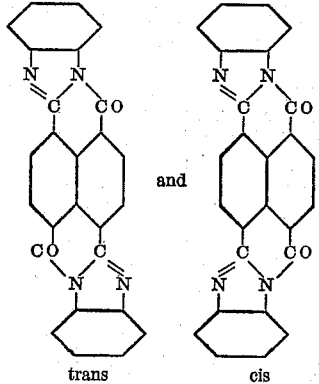

trans        cis

When condensing a substituted ortho-phenylenediamine with 1,4,5,8-naphthalene tetra carboxylic acid in many cases the same holds true, i.e. there is also obtained a mixture of the cis- and trans-isomers.

The mixture of isomeric dyestuffs may be separated into its cis- and trans-components by any suitable process, many of which have been described in the patented art. Thus, in U.S. Patent No. 1,888,624, there is described a separation into its components of such a dyestuff mixture by dissolving the dyestuff mixture in concentrated sulfuric acid and causing the dissolved dyestuffs to fractionally crystallize from the sulfuric acid solution either by diluting or cooling the said sulfuric acid solution. In U.S. Patents Nos. 1,888,625 and 1,888,626, the separation is effected by the use of chloro-acetic acid; in U.S. Patent No. 1,927,928, by the use of alcoholic alkali metal hydroxide; in U.S. Patent No. 1,952,661, toluene sulfonic acid is employed; in U.S. Patent No. 2,011,807, a solution of aluminum chloride in nitrobenzene is used; while in U.S. Patent No. 2,073,098, either sodium amide or sodium ethylate is applied to complete the separation. Of the products obtained from the original mixture of the cis-isomer and the trans-isomer, the trans-isomer is the more valuable one. Thus, more specifically, when 1,4,5,8-naphthalene tetra carboxylic acid is condensed with ortho-phenylenediamine, according to U.S. Patent No. 1,588,-451, and the mixture separated into its two isomeric components, in accordance with the process set forth in U.S. Patent No. 1,927,928, wherein toluene sulfonic acid is employed in the process of separating the two components, there is obtained the trans-isomer which dyes cotton in orange shades and is characterized by having excellent fastness properties, and the cis-isomer which has poor wash fastness, characteristic of all cis-isomers. The light fastness of the cis-isomer is fair but the dyeings bleed strongly after washing. Accordingly, the cis-isomer was considered commercially unacceptable.

As described in said application Ser. No. 637,637, by halogenating, i.e. chlorinating or brominating, the heretofore valueless cis-isomers of original mixtures of isomeric dyestuffs, very satisfactory dyestuffs with excellent fastness properties are obtained. Thus, in the case of the hitherto commercially valueless cis-isomer obtained from the mixture of isomers, prepared in accordance with Patent No. 1,588,451, for example, by chlorinating or brominating the cis-isomer a very valuable dyestuff is obtained. The shade of this latter dyestuff is shifted towards the blue and, depending upon the chlorine or bromine introduced into the molecule, desirable shades of red-browns are obtainable. This behavior of the cis-isomer was rather unexpected since the chlorine-containing compound of the formula:

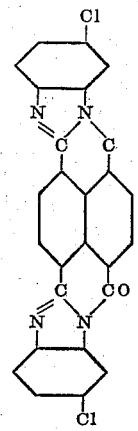

as obtained by condensing 1,4,5,8-naphthalene tetra carboxylic acid with 4-chloro-o-phenylenediamine, and subsequent separation of this compound from a mixture thereof with its trans-isomer by any of the known methods, has very poor washing fastness, and is not more valuable than the cis-isomer referred to above which is obtained in accordance with the process of U.S. Patent No. 1,588,451, i.e. one having no halogen in the molecule. It was found that by halogenating, i.e. chlorinating or brominating, the cis-isomer obtained in accordance with the process of U.S. Patent No. 1,588,451, wherein 1,4,5,8-naphthalene tetra carboxylic acid is condensed with ortho-phenylenediamine and the mixture separated into its components, the properties of the new dyestuffs obtained from the cis-isomer are entirely different and very much improved, making for a valuable dyestuff.

The exact positions into which the halogens are introduced in the cis-isomer is not certain, but due to the entirely different behavior of the halogenated cis-isomer prepared in accordance with our invention, it is believed that the halogens are not in the benzene ring, or, if they are in the benzene ring, the halogens are not in the same positions as they would have been when introduced before the condensation.

The halogenating treatment as employed in said application Ser. No. 637,637 was effected in the presence of nitrobenzene as the reaction medium, nitrobenzene being well known and widely used for this purpose in spite of the fact that the cost thereof made this procedure a rather expensive one.

We have now made the surprising discovery that the halogenation, i.e. chlorination and bromination, of the cis-isomer obtained by condensing a 1,4,5,8-naphthalene tetra carboxylic acid with an amine in accordance with Patent No. 1,588,451, may be effected, employing an aqueous reaction medium. Halogenating of this cis-isomer in this manner produces a very valuable lightfast and washfast dyestuff which colors cotton materials in a reddish-brown shade. Our discovery is of great economic significance since the use of an aqueous reaction medium makes for a substantial reduction in the cost of producing the dyestuff.

In accordance with our invention, the cis-isomer obtained by condensing a 1,4,5,8-naphthalene tetra carboxylic acid with an ortho-diamine, such as ortho-phenylenediamine, for example, is suspended in water, and the aqueous suspension subjected to the action of chlorine or bromine at a temperature of from 60° to 100° C. for period of from 20 to 40 hours. The halogenation product is then isolated from the reaction mixture.

The following examples are given for the purpose of illustrating our invention and are not to be considered in any way limitative.

*Example I*

168 grams (41.2 grams dry weight) of the cis-isomer obtained by condensing 1,4,5,8-naphthalene tetra carboxylic acid with ortho-phenylenediamine and 100 cc. of water are charged into a 1 liter, 4-neck flask equipped with an agitator, thermometer and condenser. The slurry formed is made slightly alkaline and heated to 90° C. A 13% sodium hypochlorite solution is added to the heated slurry in 20 cc. increments until a sample of the reaction mixture, after having been heated for 30 minutes, gives a blue coloration on starch-iodide paper. The slurry is then cooled to 30–70° C. and there is slowly added thereto a mixture of 36 grams of glacial acetic acid, 36 grams of bromine and 36 grams of hydrochloric acid (31.5%). After the bromine addition is finished, the temperature of the mixture is raised slowly to 80° C. and held at this temperature for 40 hours longer. The reaction mixture is then drowned in 3 liters of hot water and the excess bromine converted to bromide with sodium bisulfate. The borminated product is filtered, washed acid free and dried. 50 grams of red-brown powder containing 28.2% bromine are obtained. The brominated product dyes cotton a reddish-brown shade out of a green vat.

*Example II*

168 grams (41.2 grams dry weight) of the cis-isomer obtained by condensing 1,4,5,8-naphthalene tetra carboxylic acid with ortho-phenylenediamine and 100 cc. of water are charged into a 1 liter, 4-neck flask equipped with an agitator, thermometer and condenser. To the slurry formed is slowly added a mixture of 18 grams of glacial acetic acid, 18 grams of bromine and 18 grams of hydrochloric acid (31.5%). When the bromine addition is finished the mixture is heated slowly to 80° C. and held at this temperature for 20 hours longer. 10 grams of chlorine gas or the corresponding amount of sodium hypochlorite solution is then added to the reaction mixture over a period of 4 to 6 hours and the reaction temperature is held at 80° C. for 20 hours longer. The bromination product is isolated as described in Example I. 49.2 grams of a red-brown powder containing 26.7% bromine are obtained. The brominated product dyes cotton materials a reddish-brown shade out of a green vat.

*Example III*

102 grams (20.2 grams dry weight) of the cis-isomer obtained by condensing 1,4,5,8-naphthalene tetra carboxylic acid with ortho-phenylenediamine and 100 cc. of water and 15 grams of sodium bromide are charged into a 500 cc., 4-neck flask equipped with an agitator, thermometer and condenser. The slurry formed is agitated and heated to 60° C. until the sodium bromide is dissolved. To the slurry is added 8 grams of 31% hydrochloric acid and then in a slow stream 11.5 grams of chlorine gas. The temperature of the slurry is raised from 60° to 80° C. during the chlorine addition. After the completion of the chlorine addition the temperature of the reaction mixture is maintained at 80° C. for 20 hours longer. The bromination product is isolated as described in Example I. There are obtained 25 grams of a red-brown powder containing 22.4% of bromine. The brominated product dyes cotton materials a reddish-brown shade out of a green vat.

*Example IV*

421 grams (41.2 grams dry weight) of the cis-isomer obtained by condensing 1,4,5,8-naphthalene tetra carboxylic acid with ortho-phenylenediamine and 500 cc. of water and 80 grams of 31.5% hydrochloric acid are charged into a 2 liter, 4-neck flask equipped with an agitator, thermometer and condenser. The slurry formed is heated to 80–100° C. with agitation until a homogeneous suspension is obtained. While at this temperature there is added to the slurry, in a slow stream, chlorine gas until the reaction product has a chlorine content of 17–18%. The reaction mixture is then drowned in 2 liters of water, filtered, and the filter cake washed neutral with hot water. There are obtained 44.5 grams of a red-brown powder. The chlorinated product dyes cotton material in a reddish-brown shade out of a green vat.

It is to be understood that the foregoing detailed description is merely given by way of illustration and that many variations may be made therein without departing from the spirit of our invention.

Having described our invention, what we desire to secure by Letters Patent is:

1. Process for the preparation of vat dyestuffs of the naphthoylene diarylimidazol series, which comprises brominating the cis-isomer, free from trans-isomer, obtained by condensing 1,4,5,8-naphthalene tetra carboxylic acid with ortho-phenylenediamine, which forms a mixture of trans- and cis-isomers, and separating the cis-isomer from the mixture, by forming a slurry of said cis-isomer and water, adding a mixture of glacial acetic acid, bromine and hydrochloric acid to said aqueous slurry, heating said aqueous slurry and maintaining the temperature thereof at 60 to 100° C. for from 20 to 40 hours, and separating the dyestuff formed from the reaction mixture.

2. Process according to claim 1 wherein chlorine gas is added to the reaction mixture.

3. Process according to claim 1 wherein chlorine gas is added to the reaction mixture after the bromine addition has been finished and resulting mixture held at a temperature of 80° C.

4. Process according to claim 3 wherein the time at which said resulting mixture is held at the temperature of 80° C. is 20 hours.

5. Process for the preparation of vat dyestuffs of the naphthoylene diarylimidazol series, which comprises chlorinating the cis-isomer, free from trans-isomer, obtained by condensing 1,4,5,8-naphthalene tetra carboxylic acid with ortho-phenylenediamine, which forms a mixture of trans- and cis-isomers, and separating the cis-isomer from the mixture, by forming a mixture of said cis-isomer, water and hydrochloric acid, heating said mixture at an elevated temperature of 80 to 100° C. with agitation until a homogeneous suspension is obtained, introducing chlorine into said heated mixture until the reaction product has a chlorine content of 17–18%, and separating the dyestuff formed from the reaction mixture.

References Cited in the file of this patent

UNITED STATES PATENTS 1,588,451  Eckert et al. _____ June 15, 1926

FOREIGN PATENTS 416,385  Great Britain _____ Sept. 10, 1934